United States Patent [19]
Rohatyn

[11] Patent Number: 4,723,104
[45] Date of Patent: Feb. 2, 1988

[54] ENERGY SAVING SYSTEM FOR LARGER THREE PHASE INDUCTION MOTORS

[76] Inventor: Frederick Rohatyn, 166-10, 15th Dr., Beechhurst, N.Y. 11357

[21] Appl. No.: 784,162

[22] Filed: Oct. 2, 1985

[51] Int. Cl.$^4$ .............................................. H02P 5/40
[52] U.S. Cl. .................................. 318/813; 318/798; 318/806; 318/729
[58] Field of Search ............... 318/229, 800, 432, 799, 318/798, 813–815, 806; 323/256, 206–208

[56] References Cited

U.S. PATENT DOCUMENTS

| | | | |
|---|---|---|---|
| 3,044,008 | 7/1962 | Cooley | 323/256 |
| 3,287,624 | 11/1966 | Perry | 323/256 |
| 3,427,530 | 2/1969 | Oakes et al. | 323/256 |
| 3,544,885 | 12/1970 | Friedlander et al. | 323/206 |
| 3,723,840 | 3/1973 | Opal et al. | 318/482 |
| 3,763,413 | 10/1973 | Wattenbarger | 318/799 |
| 3,851,234 | 11/1974 | Hoffman et al. | 318/800 |
| 4,013,937 | 3/1977 | Pelly et al. | 323/207 |
| 4,276,505 | 6/1981 | Bose | 318/802 |
| 4,387,329 | 6/1983 | Harlow | 318/729 |
| 4,408,149 | 10/1983 | Collings et al. | 318/729 |
| 4,445,078 | 4/1984 | Lange | 318/729 |
| 4,477,761 | 10/1984 | Wolf | 318/800 |
| 4,554,502 | 11/1985 | Rohatyn | 323/208 |

OTHER PUBLICATIONS

Rowan et al., "A Quantative Analysis of Induction Motor Performance Improvement by SCR Voltage Control", Power Electronic Conference Record, Jan. 1982, pp. 312–321.

Queenboro Instruction Book #1060, Queenboro Transformer & Machinery Corp. College Point, New York.

Rohatyn, F. "Automatic Voltage-Drop Compensation", Queenboro Transformer & Machinery Corp. College Point, N.Y.

*Primary Examiner*—David Smith, Jr.
*Attorney, Agent, or Firm*—Erwin S. Teltscher

[57] ABSTRACT

An energy-saving system for feeding an electric induction motor serving as a load, and which is operated from a 3-phase voltage power line, and in conjunction with feeding conductors for the motor includes a power-delivery sub-system operating in a magnetically linear region and coupled to the 3-phase voltage power line for providing variable feeding voltages to the induction motor, a sensing device coupled to the induction motor for generating a signal indicative of the derivatives of active power consumed by the induction motor with respect to the voltage of at least one phase provided to the induction motor, and a control apparatus coupled to the sensing device and to the power-delivery sub-system for regulating at least one of the feeding voltages, so that the derivative of the active power with respect to the voltage of that at least one phase is always substantially zero; thus for a given mechanical power output the power consumption of the induction motor is optimized, while concurrently losses in the feeding conductors are being minimized.

13 Claims, 7 Drawing Figures

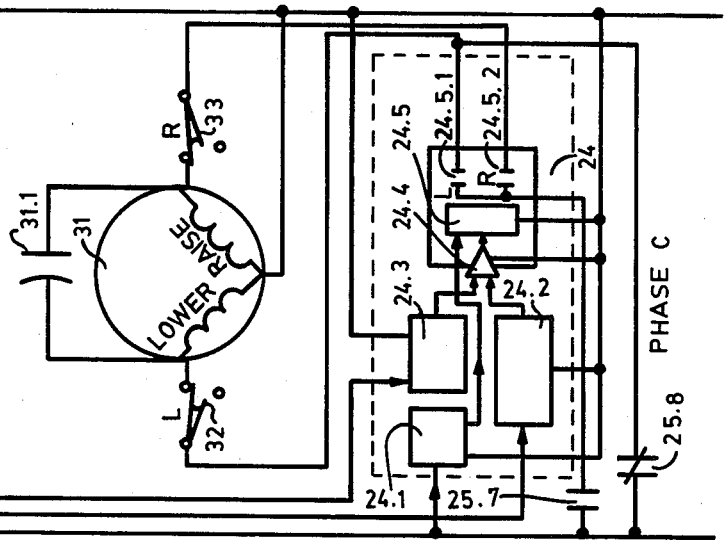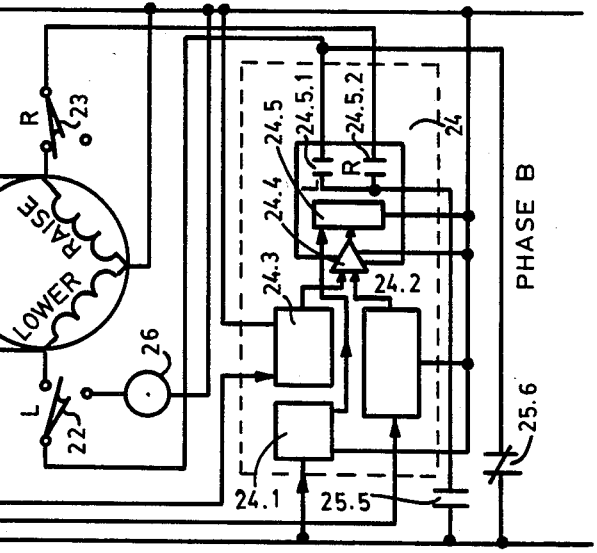
FIG. 2

PHASE B

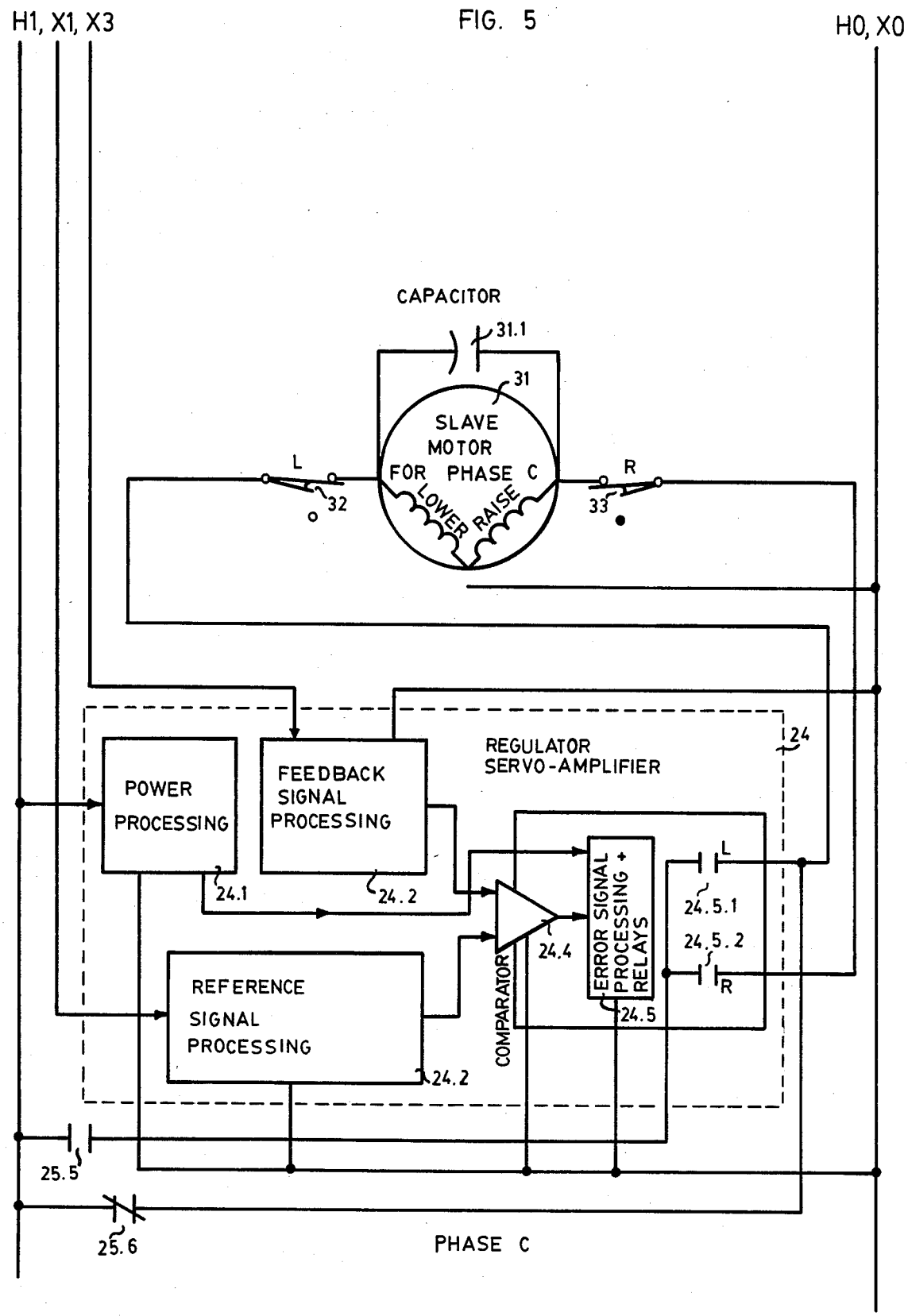

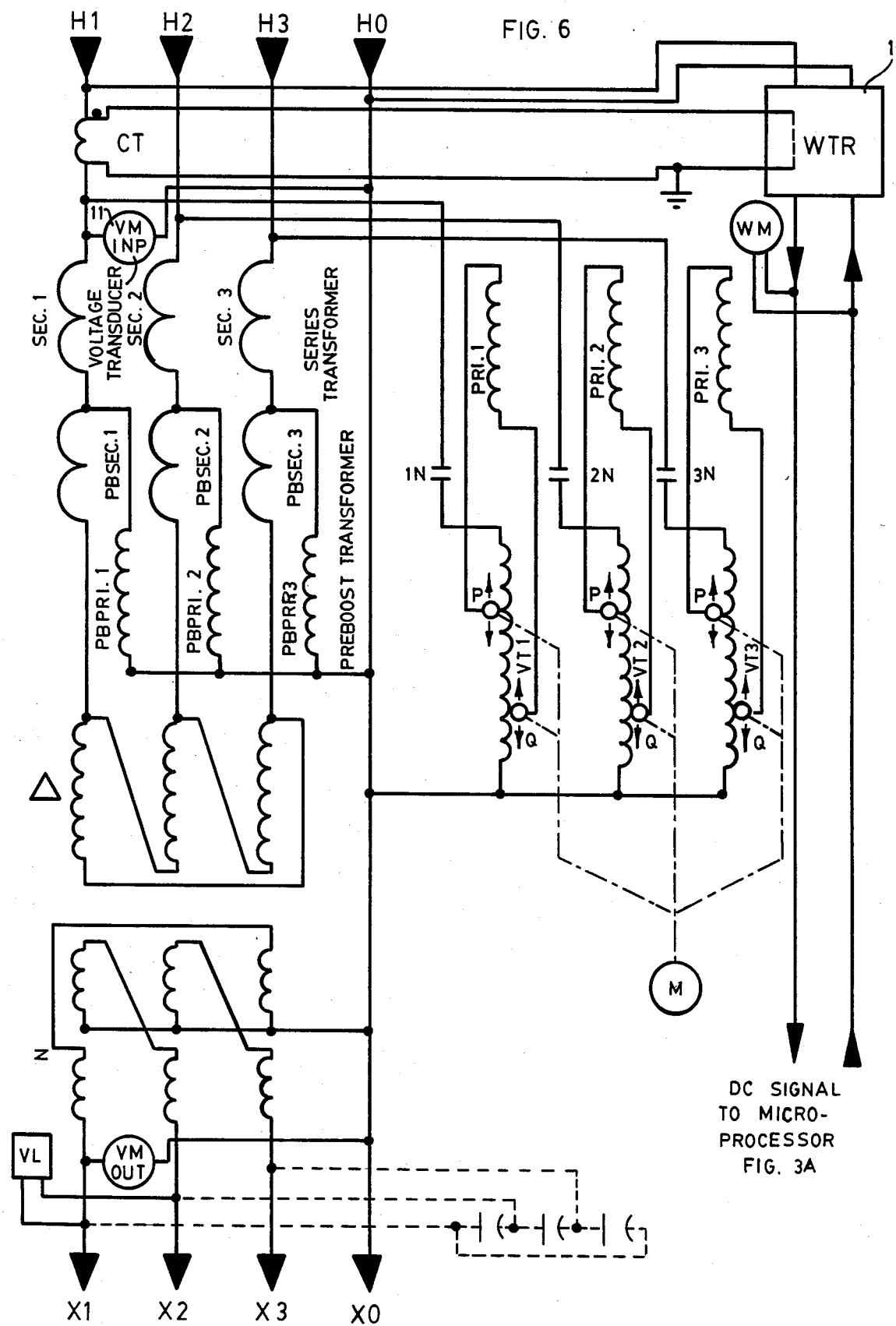

ENERGY SAVING SYSTEM FOR LARGER THREE PHASE INDUCTION MOTORS

REFERENCE TO RELATED APPLICATIONS

The following relates to continuing developments for conditioning service lines from utilities as in my application Ser. No. 271,202 filed June 9, 1981, and application Ser. No. 480,486 filed Mar. 30, 1983. Reference should also be had to copending application Ser. No. 480,496, dealing with a power factor correction system, which was filed on May 6, 1983. The present invention complements these previous inventions, and is a continuation-in-part application of application Ser. No. 579,119, filed on Feb. 10, 1984.

BACKGROUND OF THE INVENTION

The instant invention is founded on a set of theoretical concepts of what saves energy in the operation of a relatively large size three phase induction motor, and the associated criteria are as follows:

1. The power supplied to the motor must be clean, sinusoidal power. When feeding a motor with a distorted wave voltage:

(a) the motor's iron losses are increased, because of the higher harmonics at a given r.m.s. voltage level;

(b) the eddy losses, as well as any non-$I^2R$ losses in the motor winding conductors, such as skin effect, stray losses, circulating current losses are frequency dependent, and sharply increase at the presence of harmonics;

(c) the presence of harmonics precludes going high enough in the motor's flux density and consequently with a given motor with the r.m.s. feeding voltage, deprive any power source correction device of the ability to reach a favorable level;

(d) as it will be shown herein below, failure to reach a voltage high enough precludes reaching a low enough level of $I^2R$ in the motor winding;

(e) it further precludes a low-enough level of $I^2R$ in the feeding conductors;

(f) the harmonics increase the eddy, parasitic, stray, etc. losses in the feeding conductors;

(g) the harmonics increase the eddy, parasitic, stray, etc. losses in the conductor conduit or bus duct housing, particularly in a steel conduit;

(h) when feeding a motor with a voltage having a non-sinusoidal shape, the current will be non-sinusoidal, i.e. it will contain harmonics. These harmonics will be propagated forward to the motor, reducing significantly its efficiency; they will be also propagated back to the source;

(i) on their way back to the source, they contaminate the power lines, and this has a deleterious effect on critical loads connected to the affected power lines, i.e. loads like computers, cat-scans, x-ray equipment, etc.;

(j) on their way back to the source, they will make the disc of the watt-hour meter run faster, which means the watt-hour meter will indicate still higher readings than what the already substantially increased consumption due to harmonics would be.

2. The only way to provide clean, sinusoidal power is to insert exclusively linear-magnetic devices between the utility's clean sinusoidal voltage source and the motor(s) to be driven. Linear-magnetic devices work on the rectilinear portion of the hysteresis curve, never reaching the saturation knee. Today's utilities use without exception solid rotor synchronous generators to produce 3-phase electrically, and these generate and deliver a clean sine wave voltage curve from no-load to any load. When a linear magnetic device is inserted between such a source and the motor, then by laws of mathematics, a strictly sinusoidal voltage wave, free from any harmonics is delivered to the motor.

3. In today's large motors the ratio of load loss ($I^2R$+the eddy-plug loss) to the iron loss can be assigned a value of 6 at rated voltage, rated load and rated frequency.

4. Since motor manufacturers must count with normal, non-regulated feeding voltage levels which fluctuate, the commercial motor's flux density must be designed at least 10% below the limit of the hysteresis curve's linearity. Consequently, when inserting a device providing reliable regulated voltage between the utility lines and the motor(s), a feeding voltage increased up to 10% above the motor's rated voltage will provide the device designer with a method to decrease the losses in the motor, the losses in the feeding power lines, and and the losses in the conduits.

5. Energy savings obtained in the feeding lines, the cable conduit or bus duct enclosure, and billing savings in the way the watthour meter counts, are just as important as the energy savings obtained within the motor proper.

6. From what has preceded, it should be manifest that it is advantageous to feed the motor at full load with as high a voltage as flux density limitations permit. The flux density must still stay below the knee, preferably below the end of the hysteresis curve's linear portion, which can safely be assumed as being 10% over the rated excitation or being 10% applied over-voltage. When one increases the feeding voltage by this margin, the following will happen:

(A) Motor slip will decrease, consequently the speed of rotation of the motor will slightly increase. Assuming that the particular motor drives a compressor, through the slightly increased speed, the efficiency of the compressor will slightly improve. Consequently the HP demand on the motor's shaft will slightly decrease. This decrease constitutes the first saving in energy consumption.

(B) Even if (A) did not exist, with the higher feeding voltage applied, the motor load current (the in-phase components) decreases inversely proportional to the applied feeding voltage. With (A) existing, the decrease is still greater. With the current decreased, the $I^2R$ motor winding losses would decrease proportionally to the square of the increase of the applied voltage, given constant temperature. Due to the subsequent lower current density in the winding conductors and due to the associated temperature drop, the resulting $I^2R$ losses decrease in a higher power of inverse proportion compared to what the applied voltage increase would be.

(C) The motor winding eddy plus losses decrease at a much greater rate than what the squared increase of the applied voltage would be. As before under the term "eddy plus", all non-$I^2R$ losses are meant, including stray, parasitic, circulating current and skin effect losses. They are considerable in large motors. These losses are obtained from the wattmeter readings minus the $I^2R$ losses, as determined by a DC resistance premeasurement corrected to the actual reference temperature and multiplied by $I^2$.

(D) The iron losses increase with an increase of the applied voltage. From statistical analysis of test data, with a 10% overexcitation, in the worst case the iron losses will double using today's electrical steels. Yet, since as mentioned, in today's large motors at rated excitation, the iron loss amounts to no more than 1/6 of the load loss at rated current, thus doubling such a loss, is many times outweighted by the reduction of the winding losses.

(E) As in previously discussed considerations, through such an increase of the voltage applied to the motor, energy savings are not limited to the motor alone. They go further to the feeding conductors and feeding structures. Due to the increase of the motor feeding voltage, the $I^2R$ losses in the feeding cables and/or busses decrease more than in proportion to the square of the increase of the voltage, the excess above the square ratio being again caused by (A), and the lower cable and/or bus temperature.

(F) For reasons explained with regard to the motor, in cables/busses the eddy losses decrease in a substantially larger proportion than the $I^2R$ losses.

7. For reasons of safety, a large motor which works over-excited by as much as 10%, should not be turned on directly across the line. The device inserted between the utility and the motor(s) must prevent such a turn-on, and automatically reset the control circuitry in such a way as to confine every start to the device's position of lowest available motor feeding voltage, thereby also providing a soft start. Applicant's patent application Ser. No. 271,202 filed on June 9, 1981, and since matured into U.S. Pat. No. 4,438,387, covers this function and is incorporated in its entirety into this application by reference.

8. As it is known, unbalanced phase voltages cause additional motor winding load losses. Consequently, the device must include power and control means to accurately equalize the phase voltages fed to the motor, to prevent the occurence of these additional losses in cases of unbalanced incoming line voltages and/or unbalanced loads. Unbalanced utility voltages within ±5% are rather the rule than the exception.

9. When a motor runs idle, it delivers no useful work, yet it consumes a significant amount of reactive power, which has an immediate effect seen in the magnitude of the magnetizing current. The magnetizing or exciting current produces $I^2R$ and other losses in the feeding cables/busses, which add to motor's no-load losses.

One remedy is to turn off the motor(s) for a length of the periods in which they perform no useful work. The other way is to reduce the feeding voltage and compensate the reactive power.

It has been mentioned in 6 (D) that overexciting by 10% will cause (in the present electrical steels) the no load losses to double. Likewise, reducing the motor's feeding voltage by 105, will reduce both the no-load losses and the motor's magnetizing current to approximately one half of their values at the rated voltage. If, as mentioned, the no load loss at the rated voltage amounts to 1/6 of the load loss at the rated voltage plus rated load, then by reducing the voltage by 10% at idle run, will bring the no load loss down to 1/12 of the load loss at the rated voltage and rated load. For all practical purposes such a loss is optimum; there is no benefit achieved by going with the feeding voltage still lower than to those 10% below the rated voltage. Therefore, a device whose task is energy saving for motors must embody the capability of not only raising the voltage up to 10% above the rated voltage magnitude, but also in the direction below the rated voltage, never more than maximally 10%, with as little as 3% being sufficient in many cases.

Criteria 1 and 2 are important; in order to save energy, a pure sine wave power supply is required. With solid state devices (which cannot but distort the wave), there is always energy waste, and never energy preservation. Criteria 4–6 demonstrate how substantial energy savings can be achieved by means of regulating overvoltage feeding, which refers to motors when they deliver a load from 50% rated load to overload. The method also provides means for "stretching" the HP capacity of a motor, which is an added substantial benefit provided by this invention. The energy saving, which can exceed 30%, should be of utmost importance not only for the individual motor load consumer, but there is a great importance for it nationwide and worldwide. Criterion 7 describes a necessary safety measure. Criterion 8 demonstrates that unbalanced phase voltages cause substantial additional energy waste. By this invention such waste is also eliminated. Criterion 9 describes energy waste at no load and low load motor run which at times may be significant, but never as important as the losses at substantial loads. This invention provides a solution therefor.

Prior art, U.S. Pat. No. 4,052,648 granted to Frank Nola, of NASA, aims at energy savings for fractional HP motors running idle and on low loads. Even under these limited conditions, savings of energy consumed by the motors and feeding lines are problematic, because the motors are fed from the Nola device, which provides voltage of a deformed shape with respect to a sine wave. At any given HP load, including idle run, watt losses are substantially higher for a deformed voltage wave. To these increased motor losses, losses of the thyristor drive of the Nola device are added, and then the losses are also increased in the feeding lines; these loss increases are being compared to the losses with the same motor(s) at the same motor load, at the same rms feeding voltage, but with sine wave power fed. If Nola provides advantages compared with a non-regulating motor drive, these advantages are limited to fractional HP motors, running idle most of the time. From an energy standpoint, the large size motor and the motor subjected to continuous loads present a substantially more important national and worldwide energy preservation problem than all fractional horsepower motors.

OBJECTS AND SUMMARY OF THE INVENTION

The primary objective of the instant application is to obtain energy savings when driving a single relatively large motor, both in the motor proper as well as in the feeding conductors, conduits, and enclosures, by feeding the motors at loads greater than 50% of its rated load optimum watt regulated, higher-than rated voltage of harmonic-free, strictly sinusoidual waves.

Another objective is to maximize energy savings in the motor(s) proper, as well as in the feeding conductors, conduits and enclosures by regulating the magnitude of each individual applied phase voltage within an accuracy of ±0.25% in the preferred embodiment, while maintaining the angle between phase vector voltages within the utility's unchanged 120 degrees, and while delivering to the load harmonic-free, strictly sinusoidal wave voltages.

Another objective is to reduce energy losses, both in the motor(s) proper, as well as in the feeding conductors, conduits, and enclosures, by feeding the motor(s)

at loads smaller than 50% with optimum watt regulated lower-than-rated voltages of harmonic-free, strictly sinusoidal-wave shape.

Another objective, particularly at low motor loads, is to reduce the conductor-conduit-enclosure losses upstream from the apparatus, by means of additional reactive power control, as disclosed in applicant's U.S. patent application Ser. No. 480,486 which at the same time provides power factor improvement without pejoratively affecting the quality of the power.

Another objective is to prevent any generation of overvoltage or current surges upon turn-on of the motor(s), which is accomplished by means of the Turn-On-Control which is disclosed in U.S. patent application Ser. No. 271,202 which is incorporated herein in its entirety by reference.

While the apparatus per this invention provides an absolute optimum energy saving both in the motor proper as well as in the feeding conductors, when feeding a single large size polyphase motor, still a further objective of this invention is to provide significant, and for any configuration, relatively best energy savings for a group of combined three phase induction motor loads, not necessarily carrying simultaneously an equal share of the load, not necessarily being of the same or of smaller size, with the only conditions that the aforesaid motor loads be not mixed with lighting loads or any other kind of load having different characteristics than the motor loads, the conditions being that these motors be of the same rated voltage and frequency.

It is an objective of this invention to create an apparatus which will not only reduce the consumption of electric energy by the motor load(s), which will not only reduce the consumption in electric energy by the feeding cables and/or busses, conduits, enclosures, structures, etc., but also an apparatus which does not cause the watthour meter discs to run faster than the actual (in this case reduced) energy consumption amounts to.

It is a further objective of this invention not only to reduce very substantially the kilowatthours consumed by the motor loads connected to the apparatus of this invention, but also to reduce just as substantially the demand in kilowatts and the demand in kilovoltamperes.

It is a further objective of this invention to provide an energy saving apparatus which in no way affects sensitive electronic loads, including critical loads such as computers, cat scans and military equipment.

The invention can be viewed as a magnetically linear system for enhancing the motor's efficiency, or for saving energy, particularly with induction motor loads and their pertaining feeding conductors and conduits, which includes, in combination, means for sensing and issuing a signal indicative of true power consumption on incoming lines, means for providing power to at least one induction motor load at an ideal level of energy consumption and power demand at a varying feeding voltage wherein the first derivative of the power to the voltage is always zero, and means for equalizing phase voltages applied to the aforedescribed motor loads.

The system according to the preceding paragraph may be operatively associated with a multiple phase system, and wherein the processed signal of the optimum power consumption v. the applied motor load voltage regulates the positioning of a single phase of the multiple phase power system, and the therefrom resulting particular one phase's output voltage then provides the phase voltage measurement signal needed for the voltage equalization of the remaining phases.

The system set out in the preceding paragraph includes in the preferred embodiment respective additional single phase variable transformers, and respective means for modifying the positions of these additional variable transformers, and wherein the means for equalizing include means for comparing output voltage signals of additional phases not regulated by the sensing and control means to the voltage measurement signal provided by the phase regulated by the controller, and in response to a deviation therebetween provide control signals to the respective means to modify the positioning of each additional variable transformers, thereby conditioning a substantially perfect equalization of the phase voltage applied to the induction motor load.

The system of the present invention may be primarily intended to provide the greatest energy saving at full load of the motor and at loads exceeding rated full load of the motor, for a short time as well as in the case of a continuous duty system, the system's control means including a servomotor having a voltage changing function, the system's power system having the capability for generating substantially higher-than-rated variable voltages to be applied to the motor load, and the system also includes an independently acting closed-loop controlled error-detection method voltage limiter, operatively arranged to disable the voltage raising function upon the motor(s)'s feeding voltage having reached a level of a predetermined magnetization safety limit.

The system may optionally include a turn-on control system for effecting application of the lowest turn-on voltage available to the system, as an initial voltage applied to the induction motor load.

The system may optionally include a power factor correction system which supplies power to the induction motor load.

In cases where, in addition to efficiency enhancement and/or energy savings, also voltage transformation (e.g. from 480 V to 208 V) is needed, and consequently an addition of a two winding transformer is required for reasons independent of any energy considerations, the three single phase single variable transformers, plus the master/slave phase voltage equalization system can be replaced by a more economical, though less perfect system. In this alternative embodiment, only a single three-phase variable transformer needs to be used, and it is controlled by the afore-described sensing and control means, which fulfills the requirement of the optimum voltage v. power demand. The phase voltage equalization, to a degree, is accomplished by inserting at the output a two winding transformer, whose primary is preferably connected in delta, and whose secondary, i.e. the output winding, is connected in zigzag. The zigzag windings, provided they are magnetically coupled in a correct manner, accomplish an equalization of phase voltages within better than 2% when the incoming line voltages differ by 5%.

These and other objects will be made manifest when considering the following detailed specification, when taken in conjunction with the appended drawing figures.

DESCRIPTION OF THE DRAWING FIGURES

FIG. 2 is an overall schematic diagram of the control circuitry of the preferred embodiment, showing separate sub-control circuits for each of the phases A, B, and C;

Figure 3:
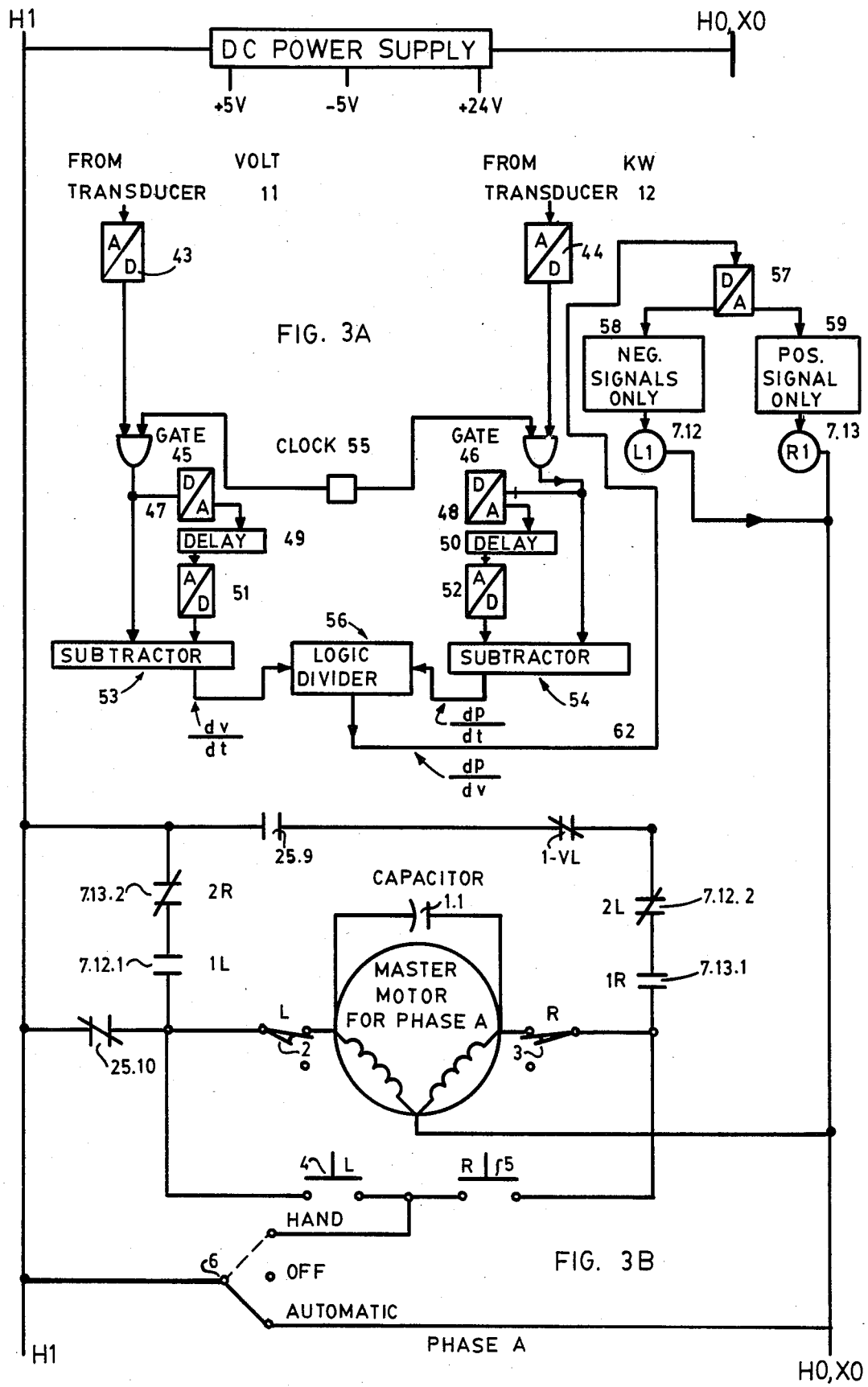
Figure 4:
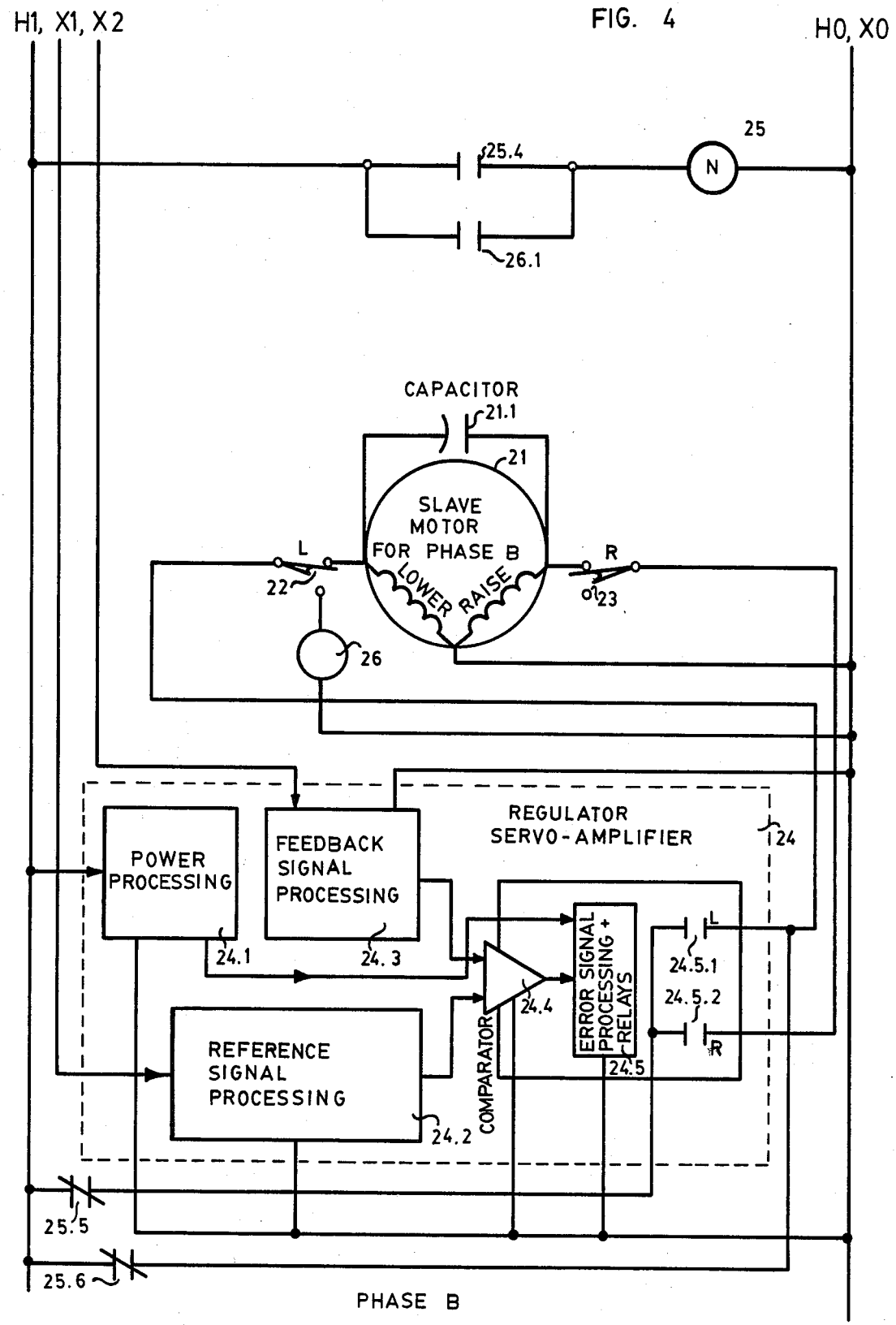

FIG. 3A is a schematic diagram of a control circuit for continuously keeping the derivative of power with respect to voltage equal to zero, and which is preferably implemented as a microprocessor, FIG. 3B is a schematic diagram showing the Master Motor of Phase A of FIG. 2, in greater detail, with its Lower and Raise Coils accepting a control input from the control circuit of FIG. 3A, FIG. 4 is an individual schematic diagram of phase B of the preferred embodiment of FIG. 2 shown in greater detail;

FIG. 5 is an individual schematic diagram of phase C of the preferred embodiment of FIG. 2 shown in greater detail;

FIG. 6 is a schematic diagram of the power circuitry of an alternate embodiment.

DESCRIPTION OF THE PREFERRED EMBODIMENT

Figure 1:
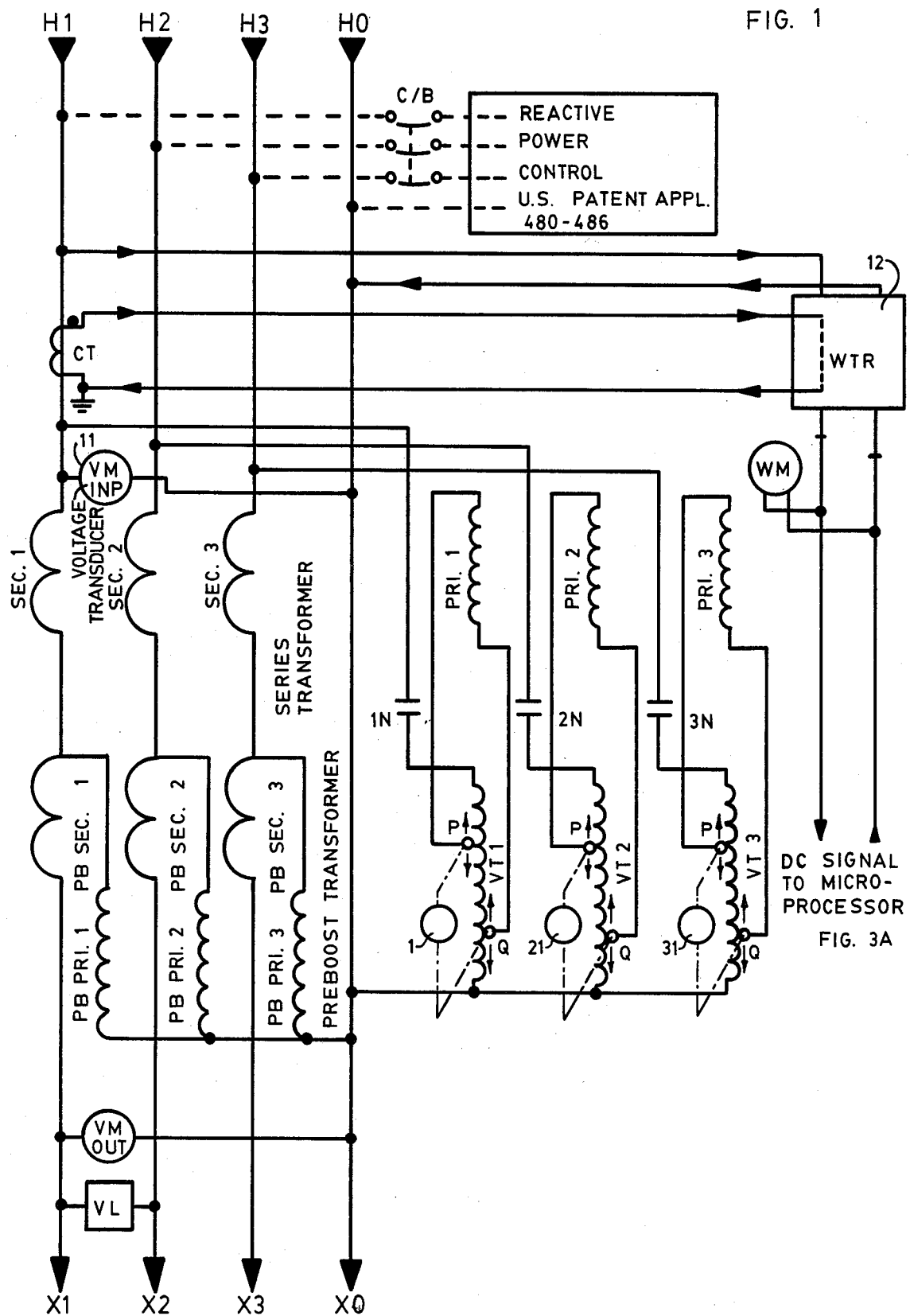
FIG. 1 is a schematic diagram of the power circuitry of the preferred embodiment.

Incoming lines are fed to terminals H1, H2, H3, H∅ (the latter being neutral) shown on the top of FIG. 1. H1 and H∅ are also shown on the top of each of the three control diagrams of FIG. 2, which should be read in conjunction with FIG. 1.

FIG. 2 is subdivided into three diagrams: a control diagram for phase A, with its servo-motor being the master motor; the control diagram of phase B with its servo-motor being a slave motor; and the control diagram of phase C, where the servo-motor is once again a slave motor.

In FIG. 1 the lines outgoing to the (motor) load are connected to the apparatus terminals X1, X2, X3, X∅, where X∅ is shown as metallically connected to H∅ and therefore having the same potential. X1, X2 also appear on the top of the diagram FIG. 2-phase B; X1, X3 also appear on the top of diagram FIG. 2, Phase B; X1, X3 also appear on the top of Diagram FIG. 2, Phase C.

In the preferred embodiment, the power circuitry consists of:

a fixed ratio 3 phase series transformer, having primary windings PRI. 1, PRI. 2, PRI. 3, and secondary windings SEC. 1, SEC. 2, SEC. 3;

a fixed ratio 3-phase preboost transformer, having primary windings PBPRI. 1, PBPRI. 1, PBPRI. 3, and secondary windings PBSEC. 1, PBSEC. 2, PBSEC. 3;

3 single-phase variable transformers VT1, VT2, VT3.

The variable transformers VT1, VT2, VT3 are a product of the Queensboro Transformer & Machinery Corporation; the variable transformer is of the column type and preferably has its current collectors P and Q constituted by carbon rollers which glide on the windings of the variable transformer coil columns. These carbon roller current collectors P and Q are in most applications driven by capacitor near motors via bevel gears and lead screws in such a way that when the current collector P rides in the up direction, the current collector Q will ride at the same speed in the opposite direction. The current collectors P and Q are in most applications displaced 180° on the circumference of the coil surface, sot hat when the collector P glides on the front of the coil, the collector Q will glide in the opposite direction on the rear of the coil. The variable transformers VT1, VT2, and VT3 are energized from the lines H1-H∅, H2-H∅ and H3-H∅ at their fixed coil ends. At the same time when the position of the collector P coincides with the position of current collector Q, both draw current from the same turn of the variable transformer, and the resulting voltage across collectors P and Q is zero. When the position of the collector P has reached one end of the coil, say, the top, and necessarily the collector Q has reached the bottom, the voltage across collectors P and Q becomes equal to the line voltage. As it may be seen from the diagram of FIG. 1, the primaries of the series transformer are fed from the collectors P and Q of the variable transformers VT1, VT2, and VT3.

Thus, when collector P has reached the top, and collector Q has reached the bottom, the line voltage is fed into the primaries of the series transformer. This voltage will induce a certain voltage in the secondaries of the series transformer, and the magnitude of this voltage will depend on the primary to secondary turn ratio. If this turn ratio is 10:1, the voltage produced by the line plus that induced in the series transformer secondary becomes 1.1 times the line voltage. By the same reasoning, when the contact P & Q coincide, i.e. when they have met on the horizontal centerline of the coil column, the line voltage plus the secondary voltage of the series transformer becomes equal to the line voltage. For any position of the carbon roillers P and Q between the lateral zero centerline and its uppermost position, the voltage appearing at the load end of the series transformer secondary varies between the magnitude of the line voltage and 1.1 times the line voltage. The voltage can be changed at will, e.g. manually by pushbuttons 4 (L=lower) and 5 (R=raise), FIG. 2, or by automatic control in infinitely small variations and brought extremely accurately to a magnitude needed.

When the collector P reaches the other extremes lowermost position, in which case the collector Q reaches its uppermost position, once again the magnitude of the voltage available on collectors P and Q is the line voltage. But as it may be seen from FIG. 1, the polarity is reversed. This reversed polarity reverses the direction of the magnetic flux of the series transformer, in consequence of which the voltage induced in the secondary of the series transformer will no longer add, but subtract from the line voltage. In the case of the series transformer windings ratio being 10:1, when collector Q reaches the top, the voltage at the load end of the secondary windings becomes 0.9.×line voltage, and according to the positions of the carbon roller collectors, the total voltage at the load end of the secondary of the series transformer ranges from 0.9 to 1.1 of the line voltage, and this can be achieved in infinite increments.

The system shown in FIG. 1 employs, in addition to the series transformer, a fixed ratio preboost transformer. This transformer preboosts the line voltage by a certain precentage of corrected voltage permitting to shift (to bias) the range of voltage variation achieved by the combination of the variable transformer and the series transformer. In the above referred example of a 10:1 winding ratio of the series transformer, and a subsequent 0.9 to 1.1 time line voltage output range, by adding e.g. a 0.02 p.u. preboost, this range is shifted to 0.92 to 1.12 times line voltage, i.e. assymmetrically around the neutral position of the variable transformer, a desirable feature in most applications. The selection of a kVA capacity for the variable transformers and for the series transformers determines the choice of the primary to secondary ratio of the series transformer and subsequently the range control of the apparatus; the selection of the preboost determines the shift of the centerpoint of the voltage variation range width. In FIG. 1 it is shown that the diagram includes an input voltmeter VM-INP on H1, H0, and an output voltmeter VMOUT on X1" X0, and a voltage transducer 11 connected in parallel therewith. Further is shown a true watt transducer WTR whose voltage path is fed from H1 HØ, and whose current path is fed from a current transformer's CT secondary winding, whose primary is applied on H1. On its output the transducer delivers a DC signal (commonly 5 mA). This output signal is connected to sensing control means shown only in block form in FIG. 3A. The transducer's DC signal is also connected to a readout instrument WM on FIG. 1, which is calibrated as a 3 phase true watt wattmeter. In FIG. 2 it may be seen that the control of Phase A has been designed to be the master control.

The schematics of phases B and C are designed to be slave control circuits. It has been mentioed that in order to obtain optimum watt consumption, one of the conditions is that the 3 phase voltages fed to the motor, which constitutes the load for the apparatus, be equal in magnitude and that they be displaced by precisely a 120° electrical angle. By employing the master/slave control circuitry, this invention achieves phase voltage equality within an accuracy of plus/minus 0.25%. The angular-/accuracy tolerance will not exceed 10'. Applicant's research reflects that energy savings compared with a 5% phase voltage imbalance for a 7.5 HP 3-phase squirrel cage induction motor amounted to as much as 16%. Savings are presumably more in larger motors. The voltage equalization saving becomes nil however, when the voltage wave is deformed, i.e. when thyristors, saturable reactors, or other non-linear magnetic instrumentalities are employed.

Each slave control circuit (Phase B and Phase C) consists of:

a single phase motor 21 with capacitor 21.1 in Phase B, motor 31 capacitor 31.1 in Phase C; and limit switches 22 (L=lower, 23 (R=raise) in Phase B, 32, 33 in Phase C; these limit switches open when the current collector assembly of the variable transformer VT 2 and/or VT 3 has reached it mechanical travel limit, and by their circuit opening, they stop the motion of the motor, preventing breakage of mechanical parts; the limit switches can be mechanical, proximity or optical switches or the equivelent; and they can also act directly or indirectly via auxiliary relays.

Servo amplifier 24, consisting of a power processing section 24.1, is fed from H1 H0; an incoming signal conditioning section 24.2; the signal is coming in from the outgoing power terminals X1X0, FIG. 2, Phase A. The magnitude of the phase voltage X1X0 is the master magnitude which is to be exactly duplicated by the phases B and C. Section 24.2 contains a step-down transformer and a full wave bridge rectifier, producing a DC reference signal; a feedback signal conditioning section 24.3 contains a step-down transformer, and a full wave bridge rectifier, producing a DC reference feedback signal; comparator-amplifier 24.4 has on its input signals entering from the reference 24.2, and from the feedback 24.3. In 24.4 the two signals are being compared with regard to 24.3's deviation in magnitude from the reference 24.2. This deviation appears as the generated positive or negative error signal on 24.4's output terminal; error signal amplification and processing section 24.5 amplifies the error signal and then activates the "Lower" or the "Raise" relay coils or solid state relays or triacs. When the N.O. lower relay contact 24.5.1 is closed, it passes current from H1 to the "Lower" winding of the servomotor, causing it to rotate in the "lower" direction until the magnitude of the error signal is reduced to the minimum within the accuracy of the servoamplifier 24. In lieu of contacts which refer to electromechanical relays, solid-state turn-on of the previously mentioned triac can be used. When the N.O. raise relay contact 24.4.2 is closed, current passes the "Raise" winding of the servomotor, causing it to rotate in the "Raise" direction, until the magnitude of the error signal has been reduced to the minimum within the accuracy of the servoamplifier 24. Here, too, the mechanical contacts can be substituted with a turn-on stage of triacs or thyristors connected in antiparallel configuration.

In larger, quicker responding apparatus motors 1, 21, 31 would preferably be brake motors. The servoamplifier 24 may include a P-I-D (proportional-integral-derivative) feature which gives the theoretically best control algorithm. The N.O. pushbuttons 4,5 can be arranged as 1 N.O.+1 N.C. cross-interlock, which makes them failsafe in case of a contact defect, a feature which has not been embodied in the diagram of FIG. 2, in order not to obscure the issues of main importance. The same cross-interlocking can be made with contacts 25.1 and 25.2.

As mentioned, the control of phase A will result in 3 equal magnitude voltages—Phase A, Phase B, Phase C, phase to netural; and subsequent 3 equal voltages, phase to phase, to a level rendering the power necessary to the motor, and at the lowest watt consumption level; therefore the controller, which optionally may be in a microprocessor configuration, must be designed to fulfill this task.

Thus the purpose is to optimize the watt consumption "P" as a function of the applied voltage "V" which is rendered sinusoidal and variable. The object is therefore to have the magnitude "V" varied insuch a way, as to always achieve the derivative $dP/dV=0$.

The automatic implementation of setting $dP/dV=0$ will be best seen from the circuit shown in FIG. 3A, which is connected to the circuit shown in FIG. 3B. In FIG. 3A an analog-to-digital converter 43 is supplied from a voltage transducer 11, also shown in FIG. 1, as VM INP, and is coupled to lines L–N. A clock 55 samples the voltage at a rate to detect changes in the average value, for example, 10 changes per minute, and a gate 45 accepts the clock signal. In the same FIG. 3A an analog-to-digital converter 44 is supplied from a kilowatt transducer 12, also shown in FIG. 1 as WTR, which is also coupled to the line L–N. The clock 55 samples the kW at the same rate as it samples the voltages, and a gate 46 accepts the clock signal. The sampled signal at gate 45 passes (a) to a subtractor 53 directly, and (b) is fed to another input of the subtractor through a delay circuitry, constituted by a digital=to-analog (D/A) converter 47, an analog delay 49, and an A/D converter 51. The total delay of the aforedescribed delay circuit is equal to 1/f, where f is the sampling frequency of the clock 55. The subtractor 53 will have at its output a signal proportional to dV/dt.

Similarly, the sampled signal at gate 46 passes (a) to a subtractor 54 directly, and (b) through delay circuitry 48, 50 and 52—an A/D converter, a delay device, and a D/A converter—to a subtractor 54, on which will appear a signal proportional to dkW/dt, alternately denoted as dP/dt. The outputs of subtractors 53 and 54 feed the input of a commercially available logic divider 56. On the output of the logic divider 56 will appear a digital signal, proportional to dV/dkW. That digitized signal is converted into an analog signal by a D/A converter 57. The output of the D/A converter 57 is fed to rectifiers 58, 59 through (non-illustrated) isolating circuitry. The output of the rectifier 58 is a "negative only" signal, while the output of the rectifier 59 is a "positive only only" signal. These outputs are fed in turn to a "lower" relay coil 7.12 and to a "raise" coil 7.13 denoted also alternately as $L_1$ and $R_1$. These coils 7.12 and 7.13 actuate the master motor shown in FIG. 3B.

D.C. power supplies are needed to operate the elements and relays shown in FIG. 3A, but for simplification on the drawing only one power supply is shown without showing the D.C. connections, to avoid obscuring of the main issues.

The master motor shown as a single phase capacitor motor activates and positions the variable transformer current collectors in the system as described on phase A only, as B and C are slave systems. The master motor remains either at standstill, or has its "lower" coil energized via relay $L_1$ 7.12, or its "raise" coil energized via relay $R_1$ 7.13.

The system in FIG. 3B contains the following elements:

7.12.—Relay coil, Lower;
7.12.1. Normally open (N.O.) Contact of Relay 7.12;
7.12.2. Normally closed (N.C.) Contact of Relay 7.12;
7.13-Relay coil, Raise;
7.13.1. Normally open (N.O.) Contact of Relay 7.13
7.13.2 Normally closed (N.C.) contact of 7.13.

VOLTAGE LIMITATIONS

It has been mentioned that the voltage applied to a motor must be limited to the end of the linear portion of the hysterisis curve of the iron core, and in compliance with this task, a voltage limiter VL is inserted between terminals X1X2, FIG. 1. The voltage limiter VL is an error detection device, similar to regulators 24, but with the following differences:

(1) The reference circuit is a zener diode circuit which embodies a potentiometer for the reference magnitude adjustment;
(2) On its output it contains one relay only, a "Raise" R relay; and
(3) This raise relay has one contact, N.C., shown on FIG. 2, Phase A, and on FIG. 3B as 1-VL, and that contact disables the raise current collector travel control upon its opening. As mentioned, it prevents the voltage from rising to a dangerous level during the regular course of control progress; it also prevents that voltage from reaching such a dangerous level, when pushbutton R (5) is kept depressed excessively, be in inadvertently or as a sabotage attempt.

TURN-ON CONTROL

Since the system per this invention is normally set up to deliver to the motor the highest voltage the motor can withstand when running at the highest flux density it can withstand, turning the motor on at such high a flux density could be disastrous. In order to prevent this, the turn-on control system per U.S. Pat. No. 4,438,387 is being used.

On FIGS. 2, 3, 4, and 5 the control system is powered from FIG. 2's terminals H1H∅. If the voltage applied to H1H2H3H∅ is the usual U.S. 208Y/120V, then H1H∅ will be 120 V. If however, the power feeding voltage is different from 208Y/120 V, and it is e.g. 480 V, then a control transformer should be inserted between the power entrance terminals and the control entrance terminals. In the case of 480V mentioned, the control transformer may be fed on it sprimary from lines H1H2 and have a ratio of 480/120 V, or it may be fed from H1H0 and have a ratio 277/120 V. The control transformer is not shown on the diagrams. When using a control transformer, its primary must be tied to the input lines of the power system of FIG. 1, and be disconnected and be reconnected at any time when the main power is disconnected and reconnected, because otherwise the Turn-On Control system would not function.

Referring to FIG. 2, Phase B, and FIG. 4, contactor coil n is shown. Its power contacts 1N, 2N, 3N are inserted in the circuits feeding the variable transformers VT1, VT1, & VT3, respectively, shown in FIG. 1. On FIG. 2 and also FIG. 4, Phase B, it is shown that through the auxiliary contact 25.4, which is N.O., coil N (25) is self-feeding. The N.O contact 25.5 switches the function of the servoamplifier 24 on or off. The same applies to phase C, FIGS. 2 and 5. Also pertaining to contactor N (25) on phase A, FIGS. 1 and 3B show N.O. contact 25.9, which opens when N is de-energized, and also N.C. contact 15.10, which clsoes at the time when 25.9 opens, and energizes the "lower" winding of the servomotor 1, which, in turn, actuates the travel of the carbon roller current collectors to run in the "lower" direction. Likewise for phase B, on FIGS. 2 and 4, the N.C. contact 25.6 upon de-energization of coil N actuates the gear of the variable transformer VT2 to run in the "lower" direction, and once again, on phase C, FIGS. 2 and 5, the N.C. contact 25.8 does the same to VT3.

Also on phase B, FIGS. 2 and 4, and auxiliary relay 26 is shown. It is energized from the motor's 21 "lower" limit switch 22 at the limit switches N.O. position at the current collector having hit the lower location. Relay's 26 N.O. contact 26.1 bypass the contactor N's self-feeding contact 25.4

The turn-on control system operates as follows. When power is disconnected, the contactor N is de-energized; contacts 1N, 2N and 3 N open, interrupting thereby the feeding circuit to the variable transformers VT1, VT2, and VT3. Contact 25.4 opens, interrupting the self-feeding circuit to contactor coil N (25). Contacts 25.5, 25.7 open, disconnecting the servoamplifiers 24.1, cutting off the automatic control of motors 21, 31. Contact 25.9 opens, disabling the "raise" control of motor 1. Contacts 25.6, 25.8, 25.10 close, closing the circuits for the energization of the "lower" windings of the 3 servomotors 1, 21, and 31. At the instant of power reconnection or power restoration, the contactor coil N is still disconnected, and subsequently de-energized. The feeding of the variable transformers VT1, VT2 and VT3 is interrupted; they now constitute damping loads for the series transformers' primaries; the series transformer primaries become at this stage the secondaries, and the series transformer secondaries become the primaries; the apparatus' output voltages X1, X2, and X3 are some 10% lower than H1, H2 and H3, and at a time moment zero after energization, the voltage applied to the motor load at terminals X1, X2, and X3 provides a "soft" start.

At the time moment zero, the servomotors 1, 21 and 31 start their motion in the "lower" direction, which continues until the mechanical end location has been reached. At that time moment on phase B, the limit switch L (22) opens the motor 21's lower winding circuit, and turns on the relay coil 26, whose contact 26.1 closes, energizing the coil of the contactor N (25). With N energized, contact 25.4 closes, and from now on N is self-fed; contacts N1, N2, and N3 close, the variable transformers VT1, VT2, and VT3 are energized from the service lines, and start to operate; contact 25.9 closes, enabling the motor 1's "raise" travel; contacts 25.5, and 25.7 close, turning on the automatic circuits of motors 21 and 31. Contacts 25.6, 25.8 and 25.10 are open. At the time moment in which the limit switch 22 of phase b is hit or activated, the apparatus provides its lowest voltage on terminals X1, X2, and X3.

REACTIVE POWER COMPENSATION AND MINIMIZATION OF LINE LOSSES.

On FIG. 1, top, a reactive Power Control System is added. The system is basically that described in my U.S. patent application Ser. No. 480,486 sine matured into U.S. Pat. No. 4,554,502. It is important particularly in cases when the load on terminals X1,X2,X3 is not a single motor, but a plurality of motors, and/or when the load is a single motor, but running at times at idle or low load. Additional energy savings will be obtained primarily on low loads and will occur appreciably upstream from the load.

DESCRIPTION OF THE ALTERNATE EMBODIMENT

FIG. 6 shows the schematic diagram of the power circuitry, while FIGS. 3A and 3B show the schematic diagram of the control circuitry. FIGS. 2, 4 and 5 are not applicable here. Incoming lines are fed to the terminals H1, H2, and H3, as in the preferred embodiment.

The power circuitry consists of: a fixed ratio 3 phase series transformer, having primary windings PRI. 1, PRI.2, PR.3 and secondary windings PBSEC.1, PBSEC.2, and PBSEC.3 the same as in the preferred embodiment; a single-body three phase variable transformer VT; a 3 phase 2 winding transformer, having its primary windings connected in delta, and having its secondary windings in zigzag.

The variable transformer is a product of the Queensboro Transformer and Machinery Corporation, a three phase unit, but otherwise as per description of the preferred embodiment. The carbon roller current collectors of all the 3 phases, i.e. of all the six groups, are driven by a single gearmotor M.

The delta to zigzag two winding transformer is a product of the Queensboro Transformer and Machinery Corperation and is not otherwise commercially known, or available. Where it differs from commercial transformers is that its secondary windings are not merely connected in zigzag, but are actually zigzag coupled, in the way as e.g. single-phase, 3 wire correctly laid out transformer windings are magnetically linked, to preclude stray field unbalance, and subsequent uneven voltages on the two halves of the 3-wire system under unequal loads. The Queensboro zigzag system cancels out the residual neutral flux and equalizes the induced phase voltage within limits of ±2% at an incoming line voltage unbalance of 5% and a simultaneous load unbalance up to 100%.

For such energy saving applications, like reducing the energy consumption for computer-feeding motor-generator sets which convert 60 to 415 Hertz, the mentioned Queensboro deltato-zigzag transformers are electrostatically "quadruply" shielded. It provides four Faraday shields: One shield per phase is between the primary and secondary windings and is permanently connected to ground potential. One shield per phase is wrapped around the primary windings alone and is connected to either the ground or a primary live potential per phase. One shield per phase is wrapped around this zigzag half winding whose end forms the neutral, and this shield is permanently connected to ground. The last shield per phase is wrapped around the zigzag half winding whose end forms the output terminal per phase, i.e. X1, X2, X3, and this shield is permanently connected to its pertaining live terminal, and the three terminals are connected to a capacitor bank as shown in dotted line on FIG. 6.

This box type shielding including the added capacitor contribute also to transient suppression needed for the computer load. More specifically, these shields decouple the primary-to-secondary capacitance, thereby eliminating the incoming line's common mode noise, suppressing the transverse mode noise, eliminating the in-phase power line disturbances, and suppressing the out-of-phase disturbances. For the sake of avoiding obscurance of the main issue, the shields have not been shown on FIG. 6.

The energy saving function of this Alternate Embodiment works as follows:

The part of the diagram FIG. 6, exclusive of the delta/ zigzag transformer, but inclusive of the control diagram of FIG. 3, generates at all times a mean phase voltage which provides the optimum (i.e., minimum) kilowatt power consumption which the variation of the voltage alone can render, and the physics work exactly the same as in the preferred embodiment. Contrary to the preferred embodiment, this part does not provide phase voltage equalization which constitutes a separate factor needed for attaining absolute minimum kilowatt power consumption. This task of phase voltage equalization is in the Alternate Embodiment attained by magnetic means using the special non-commercial delta/zigzag transformer.

The Preferred Embodiment provides more perfect phase voltage equalization and results in greater saving of energy. Since the cost of the delta/zigzag transformer is lower than the cost difference between 3 single phase and one 3-phase variable transformers plus the master/slave control system, the Alternate Embodiment is lower in cost than the Preferred Embodiment, and more so in applications in which the range of the output voltage is required to be at an entirely different level than the range of the incoming line voltage. In addition, for energy saving of computer-controlled frequency changing motor-generator sets, and simultaneous direct feeding of other computer room elements where provision of clean power is an added requirement, the Alternate Embodiment compares favorably with the Preferred Embodiment.

Having thus described the invention it should be understood that numerous structural modifications and adaptations may be resorted to without departing from the spirit of the invention.

What is claimed is:

1. An energy-saving system for feeding an electric induction motor acting as a load, said motor having a rated voltage, and being operable from a 3-phase voltage power line, and in conjunction with feeding conductors for said motor, said motor including an iron core defining a hysteresis curve, said hysteresis curve having a linear portion, and a knee adjoining said linear portion, comprising in combination power-delivery means operating in a magnetically linear region and being fed from said 3-phase voltage power line for applying variable feeding voltages to said induction motor in a range which includes the range above said rated voltage, sensing means coupled to said induction motor for generating a signal indicative of the derivative of active power consumed by said induction motor with respect to the voltage of at least one phase provided to said induction motor, means for limiting said feeding voltages so that the magnitude of the applied voltages produces a flux density up to just below the knee of said hysteresis curve and up to near the end of said linear portion of said hysteresis curve, and control means coupled to said sensing means and to said power-delivery means for regulating at least one of said feeding voltages so that the derivative of said active power with respect to the voltage of said at least one phase is always substantially zero, said control means including variable transformer operable voltage raising and voltage lowering means fed from one phase of said 3-phase power line, said means for limiting said feeding voltages to the end of the linear portion of said hysteresis curve being operable so as to disable said voltage raising means from operating beyond a safe limit, whereby for a given mechanical power output the power consumption of said induction motor is optimized, while concurrently losses in said feeding conductors are being minimized, and the exciting current of sid motor is held within a safe level, so that said motor is operable at said flux density up to just below the knee and up to near the end of said linear portion of said hysteresis curve, wherein said sensing means comprise sampling means for sampling said active power consumed by said motor and by said feeding lines, and for sampling the feeding voltage of at least one phase at a sampling frequency sufficiently high to detect any changes in average power and mean voltage, active power-to-time derivative measuring means, and feeding voltage-to-time derivative measuring means, said derivative measuring means being coupled to said induction motor, and logic circuitry including divider means connected to said derivative measuring means for obtaining a signal proportional to the derivative of said active power with respect to said feeding voltage of said at least one phase, wherein said feeding voltage-to-time derivative measuring means includes at least one voltage transducer connected to said induction motor, and a first analog-to-digital converter coupled to said voltage transducer for digitizing the output of said first analog-to-digital converter, first delay means post-coupled to said voltage transducer and having a delay equal to the inverse of said sampling frequency, a second analog-to-digital converter post-coupled to said first delay means for digitizing the output of said first delay means at said sampling frequency, and a first subtractor receiving on one input thereof the output of said first analog-to-digital converter, and receiving on the other input thereof the output of said second analog-to-digital converter.

2. The energy-saving system as claimed in claim 1, wherein said 3-phase power line delivers sinusoidal voltages, said feeding conductors are housed in conduits or bus ducts, and said power-delivery means include magnetic components defining a hysteresis curve including a knee, said curve above said knee defining a non-linear magnetic region, said magnetic components operating below said hysteresis knee in said magnetically linear region, whereby said sinusoidal voltage from said power line is not deformed, and losses in said motor, said feeding conductors, conduits or bus ducts are kept to a minimum.

3. The energy-saving system as claimed in claim 2, wherein due to said magnetic components operating below said knee of said hysteresis curve harmonics of said sinusoidal voltages are substantially absent, whereby current passing through the disc of a power-measuring watthour meter coupled to said induction motor is precluded from generating any added torque, thereby preventing any billing by a utility beyond normal billing due to sinusoidal currents caused by said sinusoidal voltages.

4. The energy-saving system as claimed in claim 1, wherein said 3-phase voltage power line has voltages of respective individual phases which differ in magnitude from each other by respective varying amounts, and further comprising equalizing means for substantially equalizing the magnitudes of all of the phase voltages at the input of said induction motor.

5. The energy-saving system as claimed in claim 4, wherein said equalizing means for substantially equalizing the magnitudes of all of the phase voltages include two-winding transformer means having their primaries connected in delta, and their secondaries connected in zigzag and feeding said induction motor, said secondaries being isolated from said primaries, so that any unequal phase voltages transmitted from said power line and applied to the primaries of said transformer means substantially do not result in any unequal phase voltages on the secondaries of said transformer means feeding said induction motor.

6. The energy-saving system as claimed in claim 5, wherien said variable voltage producing means includes a three-phase variable transformer.

7. The energy-saving system as claimed in claim 4, wherein said equalizing means for substantially equalizing the magntidues of all of the phase voltages include two-winding transformer means having their primaries connected in wye, and their secondaries connected in zigzag and feeding said induction motor, so that any unequal phase voltages transmitted from said power line and applied to the primaries of said transformer means substantially do not result in any unequal phase voltages on the secondaries of said transformer means feeding said induction motor.

8. The energy-saving system as claimed in claim 7, wherien said variable voltage producing means includes a three-phase variable transformer.

9. The energy-saving system as claimed in claim 1, wherein said power-delivery means and said induction motor is in a given path, said given path emanating from power generating means, and further comprising a power-factor correction system for reactive power control and concomitant power factor correction connected to said power line, said power correction system including reactive power compensation means in shunt with said power line, independent of said given path, free of current flowing in said given path to said magnetic power-delivery means and to said induction motor and in shunt with said magnetic power-delivery means, and including fixed capacitance means, and voltage applying means delivering a voltage of continuously variable magnitude in a stepless manner to said fixed capacitance means in response to any change in reactive power consumed by said induction motor so as to correct the magnitude of the power factor in said power line feeding said induction motor to a predetermined correction value, whereby power factor correction is optimized, yet does not produce any power line disturbant transients.

10. The energy-saving system as claimed in claim 1, wherein said power-delivery means includes a series transformer having isolated primary and secondary windings, said secondary winding being connected in series with a given line voltage from said power line so as to provide a feed voltage to said induction motor, and a variable transformer fed form said power line and feeding said primary winding of said series transformer with a first variable voltage, so as to, in turn, induce a second variable voltage in said secondary winding, and further comprising a turn-on control system fed form said power line for ensuring that the voltage delivered to said electric induction motor at the moment of power turn-on is a lowest available voltage, said turn-on system including voltage detection means, including regulation means responsive to the presence of line voltage on said power line, for disconnecting said variable voltage transformer from said power line upon absence of power, said variable voltage transformer thereby becoming a damping load across said series transformer primary winding, whereby said series transformer secondary winding acts as a primary winding, and said primary winding acts as a secondary winding, while said variable voltage transformer is disconnected from said power line, and concurrently said voltage detection means disabling itself, and disabling said regulation means, enabling means responsive to restoration of power for setting said variable voltage transformer to its loweest voltage, and means operative subsequently to settling of said variable voltage transformer to said lowest voltage for reconnecting said varible voltage transformer to said power line, and for subsequent restoration of said primary winding and of said secondary winding of said series transformer to their normal respective functions, and thereby re-enabling of said regulation means, whereupon normal operation of said efficiency-enhancing system is resumed.

11. An energy-saving system for feeding an electric induction motor acting as a load, said motor having a rated voltage, and being operable from a 3-phase voltage power line, and in conjunction with feeding conductors for said motor, said motor including an iron core defining a hysteresis curve, said hysteresis curve having a linear portion, and a knee adjoining said linear portion, comprising in combination power-delivery means operating in a magnetically linear region and being fed from said 3-phase voltage power line for applying variable feeding voltages to said induction motor in a range which includes the range above said rated voltage, sensing means coupled to said induction motor for generating a signal indicative of the derivative of active power consumed by said induction motor with respect to the voltage of at least one phase provided to said induction motor, means for limiting said feeding voltages so that the magnitude of the applied voltaged produces a flux density up to just below the knee of said hysteresis curve and up to near the end of said linear portion of said hysteresis curve, and control means coupled to said sensing means and to said power-delivery means for regulating at least one of said feeding voltages so that the derivative of said active power with respect to the voltage of said at least one phase is always substantially zero, said control means including variable transformer operable voltage raising and voltage lowering means fed from one phse of said 3-phase power line, said means for limiting said feeding voltages to the end of the linear portion of said hysteresis curve being operable so as to disable said voltage raising means from operating beyond a safe limit, whereby for a given mechanical power output the power consumption of said induction motor is optimized, while concurrently losses in said feeding conductors are being minimized, and the exciting current of said motor is held within a safe level, so that said motor is operable at said flux density up to just below the knee and up to near the end of said linear portion of said hysteresis curve, wherein said sensing means comprise sampling means for sampling said active power consumed by said motor and by said feeding lines, and for sampling the feeding voltage of at least one phase at a sampling frequency sufficiently high to detect any changes in average power and mean voltage, active power-to-time derivative measuring means, and feeding voltage-to-time derivative measuring means, said derivative measuring means being coupled to said induction motor, and logic circuitry including divider means connected to said derivative measuring means for obtaining a signal proportional to the derivative of said active power with respect to said feeding voltage of said at least one phase, a digital-to-analog converter postcoupled to said divider means, and wherein said signal proportional to the derivative of said active power with respect to said at least one feeding voltage includes positively-going and negatively-going signals, and a reversible servomotor, and wherein said control means includes first signal passing means passing only said positively-going signals, and second signal passign means passing only said negatively-going signals, said signal passing means being connected to an output of said digital-to-analog converter, said reversible servomotor being actuatable by said signal passing means, and wherein said power delivery means includes variable voltage producing means actuated by said servomotor, wherein said variable voltage producing means include said varible transformer fed from said one phase of said 3-phase power line, and wherein said control means includes master control means regulating the voltage of said one phase, and providing a reference signal, and two slave controlmeans including second and third variable transformers, respectively, controlled by said master controlmeans, and regulating the voltages of each of the remaining phases of said 3-phase power supply line in dependence of said reference signal of said master control means.

12. The energy-saving system as claimed in claim 1, wherein said active power-to-time derivative measuring means includes at least one watt transducer coupled to said induction motor, and a third analog-to-digital converter coupled to said watt transducer for digitizing the output of said watt transducer, second delay means postcoupled to said watt transducer and having a delay equal to the inverse of said sampling frequency, and a fourth analog-to-digital converter postcoupled to said second delay means for digitizing the output of said second delay means of said sampling frequency, and a second subtractor receiving on one input thereof the output of said second analog-to-digital converter, and receiving on the other input thereof the output of said fourth analog-to-digital converter.

13. The energy-saving system as claimed in claim 1, further including a digital-to-analog converter postcoupled to said divider means, and wherein said signal proportional to the derivative of said active power with respect to said at least one feeding voltage includes positively-going and negatively-going signals, and a reversible servomotor, and wherein said control means includes first signal passing means passing only said positively-going signals, and second signal passing means passing only said negatively-going signals, said signal passing means being connected to an output of said digital-to-analog converter, said reversible servomotor being actuatable by said signal passing means, and wherein said power delivery means includes variable voltage producing means actuated by said servomotor.

* * * * *